(12) United States Patent
Yi

(10) Patent No.: US 10,596,447 B1
(45) Date of Patent: Mar. 24, 2020

(54) FOLDABLE SNOW SLIDING DEVICE

(71) Applicant: Ji Ha Yi, Seoul (KR)

(72) Inventor: Ji Ha Yi, Seoul (KR)

( * ) Notice: Subject to any disclaimer, the term of this patent is extended or adjusted under 35 U.S.C. 154(b) by 0 days.

(21) Appl. No.: 16/236,733

(22) Filed: Dec. 31, 2018

(30) Foreign Application Priority Data

Dec. 31, 2018 (KR) .................. 10-2018-0173259

(51) Int. Cl.
*A63C 5/02* (2006.01)
*A63C 5/03* (2006.01)
*F16C 11/10* (2006.01)

(52) U.S. Cl.
CPC .................. *A63C 5/02* (2013.01); *A63C 5/03* (2013.01); *F16C 11/10* (2013.01)

(58) Field of Classification Search
CPC .... A63C 5/02; A63C 2203/10; A63C 2203/06
See application file for complete search history.

(56) References Cited

U.S. PATENT DOCUMENTS

| 2,332,404 | A | * | 10/1943 | Smith | A63C 5/02 |
| | | | | | 280/603 |
| 3,689,093 | A | * | 9/1972 | Meland | A63C 5/02 |
| | | | | | 280/603 |
| 4,632,418 | A | * | 12/1986 | Brue Moya | A63C 5/02 |
| | | | | | 280/603 |
| 4,844,499 | A | * | 7/1989 | Baumann | A63C 5/02 |
| | | | | | 280/603 |
| 6,616,170 | B1 | * | 9/2003 | Quarti | A63C 5/02 |
| | | | | | 280/603 |
| 7,159,875 | B2 | | 1/2007 | Seymour | |
| 7,976,034 | B1 | * | 7/2011 | Hong | A63C 17/01 |
| | | | | | 280/87.042 |
| 8,910,959 | B2 | * | 12/2014 | Alva | A63C 17/015 |
| | | | | | 280/87.05 |
| 10,071,302 | B2 | * | 9/2018 | Sala | A63C 17/015 |
| 2004/0046363 | A1 | * | 3/2004 | Emanuele | A63C 5/02 |
| | | | | | 280/603 |
| 2007/0079529 | A1 | * | 4/2007 | Ekberg | A63C 5/02 |
| | | | | | 36/122 |
| 2008/0174089 | A1 | * | 7/2008 | Ekberg | A63C 5/02 |
| | | | | | 280/603 |
| 2009/0256332 | A1 | * | 10/2009 | Ekberg | A63C 5/02 |
| | | | | | 280/603 |
| 2016/0107068 | A1 | * | 4/2016 | Avgustin | A63C 9/003 |
| | | | | | 280/603 |

(Continued)

FOREIGN PATENT DOCUMENTS

| JP | H06-198017 A | 7/1994 |
| KR | 20-1998-0054250 U | 10/1998 |
| KR | 20-0175908 Y1 | 3/2000 |

*Primary Examiner* — Brian L Swenson
(74) *Attorney, Agent, or Firm* — Paratus Law Group, PLLC

(57) ABSTRACT

Disclosed is a foldable snow sliding device with a foldable deck. The foldable snow sliding device includes: a flat strip-shaped center deck; and two folding decks rotatably connected with respective longitudinal ends of the center deck so as to be folded toward the center deck in an oblique direction with respect a center line of the center deck, whereby the folding decks do not overlap each other and extend in parallel with each other when the folding decks are folded to come into close surface contact with the center deck.

11 Claims, 12 Drawing Sheets

(56) References Cited

U.S. PATENT DOCUMENTS

2016/0121196 A1* 5/2016 Eiselin ................ A63C 5/02
                                                                              280/604
2019/0022513 A1* 1/2019 Avgustin ............. A63C 5/02

\* cited by examiner

FOLDABLE SNOW SLIDING DEVICE

CROSS REFERENCE TO RELATED APPLICATION

This application claims priority to Korean Patent Application No. 10-2018-0173259, filed Dec. 31, 2018, which is hereby incorporated by reference in its entirety.

BACKGROUND OF THE INVENTION

1. Field of the Invention

The present invention relates to a snow sliding device and, more particularly, to a snow sliding device that can be stored or used in a folded state.

2. Description of the Related Art

Sports that use a device facilitating sliding on a snowy surface are exemplified by skiing and snowboarding. Skiing is an activity in which a person glides on snow by using a pair of skis attached to the user's feet and a pair of poles. Snowboarding is an activity in which a person glides on snow with the user's feet on a single snowboard.

Snow sliding devices used for such sports performed on a snowy surface are difficult to store and carry because of their long lengths. In order to solve this problem, foldable skis have been developed. However, since a ski is typically structured such that the tip and the tail are curled upward, a conventional foldable ski has problems that it has a considerably increased thickness in a folded state and it is easily damaged when a heavy load is applied thereto.

In addition, when using conventional foldable skis, a user needs to take off the skis for walking and then to put on the skis for gliding on snow. This is because it is difficult for a user to walk on a flat surface or an uphill slope in a state of wearing conventional skis. Since it is troublesome to put on and take off snow sliding devices frequently for switching between gliding and walking, the user's discomfort increased.

DOCUMENTS OF RELATED ART

Patent Document

Korean Utility Model No. 20-0175908
U.S. Pat. No. 6,616,170 B1
U.S. Pat. No. 7,159,875 B1

SUMMARY OF THE INVENTION

Accordingly, the present invention has been made to solve the above problems occurring in the related art, and an object of the present invention is to provide a foldable snow sliding device configured such that a tip and a tail do not overlap each other in a folded state of the foldable snow sliding device, thereby having a reduced thickness in the folded state as compared with a conventional snow sliding device.

Another object of the present invention is to provide a foldable snow sliding device allowing a user to walk wearing the foldable snow sliding device even in a state in which the snow sliding device is folded.

According to one aspect of the present invention, there is provided a foldable snow sliding device with a foldable deck, the device including: a flat strip-shaped center deck; and two folding decks rotatably connected with respective longitudinal ends of the center deck so as to be folded toward the center deck in an oblique direction with respect to a center line of the center deck, whereby the folding decks do not overlap each other and extend in parallel with each other when the folding decks are folded to come into close surface contact with the center deck.

The both longitudinal ends of the center deck may be provided with respective hinge members, and the two folding decks may be rotatably connected with the respective hinge members.

When the folding decks are folded to come into close surface contact with the center deck, a tip and a tail respectively provided at a front end of one of the folding decks and a rear end of the other one of the folding decks protrude in a second direction opposite to a first direction in which a binding means protrudes from a first surface of the center deck.

Each hinge member may include: a hinge body provided between the center deck and a corresponding one of the folding decks in a longitudinal direction of the center deck; and
a pair of hinge shafts which connects the hinge body with the center deck and connects the hinge body with the corresponding one of the folding decks.

Unfolded-state locking units may be respectively provided between one of the two folding decks and the center deck and between the other one of the folding decks and the center deck, in a longitudinal direction of the center deck, in which each of the unfolded-state locking units is formed to cross a boundary between the center deck and a corresponding one of the folding decks, thereby enabling the folding decks to remain unfolded.

Each of the unfolded-state locking units may include: a locking post movable from a center channel formed in the center deck to a folding channel formed in a corresponding one of the folding decks or from the folding channel to the center channel; and a knob connected to the locking post, in which a mouth of the center channel and a mouth of the folding channel face each other in an unfolded state in which the center deck and the folding deck are flush with each other so that the locking post is movable from the center channel to the folding channel or from the folding channel to the center channel.

Each of the unfolded-state locking units may be an extendable rod that is stretched on an outer surface of a corresponding one of the folding decks and an outer surface of the center deck, in which the extendable rod is installed on the folding deck and is pulled out to be stretched to a position on the center deck or is installed on the center deck and is pulled out to be stretched to a position on the folding deck.

Each of the unfolded-state locking units may include two protrusions respectively protruding toward the center deck and the folding deck from the hinge member and two fixing pins one of which connects one of the protrusions with the center deck and the other one of which connects the other protrusion with the folding deck.

A second surface of each folding deck may be provided with an anti-slipping member to increase frictional force with respect to a snowy surface, in which the second surface of each folding deck faces the second direction and the first surface of the center deck, on which the binding means is provided, faces the first direction in a state in which the folding decks are folded.

A folded-state locking unit may be provided at a position at which the center deck and a corresponding one of the folding decks face each other when the folding decks are folded, thereby enabling the folding decks to remain folded.

The folded-state locking unit may include a pair of magnets one of which is provided on the center deck and the other one of which is provided on the folding deck, or the folded state locking unit may include a magnet and a metal piece one of which is provided on the center deck and the other one of which is provided on the folding deck.

The foldable snow sliding device according to the present invention has advantages described below.

The foldable snow sliding device can be folded such that both longitudinal end portions extend in parallel with each other rather than overlapping each other. Therefore, the foldable snow sliding device has a reduced thickness when folded as compared with a conventional foldable snow sliding device. That is, the foldable snow sliding device has a reduced thickness volume when folded as compared with a conventional foldable snow sliding device. Therefore, the foldable snow sliding device according to the present invention are easy to store and carry, and there is a less likelihood that the tip and the tail of the foldable snow sliding device are damaged due to interference with each other.

When the foldable snow sliding device according to the present invention is in a folded state, the tip and the tail protrude in a direction opposite to a direction in which the binding means protrudes. Therefore, when a user walks wearing the foldable snow sliding device that is in a folded state, since the tip and the tail are easily stuck in an icy or snowy surface, the frictional force between the snow sliding device and the icy or snowy surface is increased. Therefore, the user can easily walk wearing the snow sliding device. In addition, the user needs not take off the snow sliding device for walking on snow. That is, since it is not necessary for a user to frequently take off and put on the snow sliding device for switching between walking and gliding on snow, the usability of the snow sliding device is improved.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE PREFERRED EMBODIMENTS

Herein below, exemplary embodiments of the present invention will be described in detail with reference to the accompanying drawings. Reference should be made to the drawings, in which the same reference signs or numerals are used throughout the drawings to designate the same or similar components. Further, in describing exemplary embodiments of the present invention, well-known functions or constructions will not be described in detail since they may unnecessarily obscure the understanding of the exemplary embodiments of the present invention.

Terms, such as first, second, A, B, (a), (b), etc. may be used herein to describe elements of the present invention. Each of these terms is not used to define essence, order, sequence, or number of an element, but is used merely to distinguish one element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

A foldable snow sliding device according to the present invention may be a ski or a snowboard which is worn by a user to slide on a snowy surface. Hereinafter, a ski having one deck to be attached to a user's foot is described as one embodiment of the present invention, but the idea in the following description can be applied to a snowboard. The foldable snow sliding device of the present invention is used normally in an unfolded state. That is, it slides on snow in the unfolded state. On the other hand, it is carried or stored in a folded state. Hereinafter, a structure for folding the foldable snow sliding device will be described.

Figure 1:
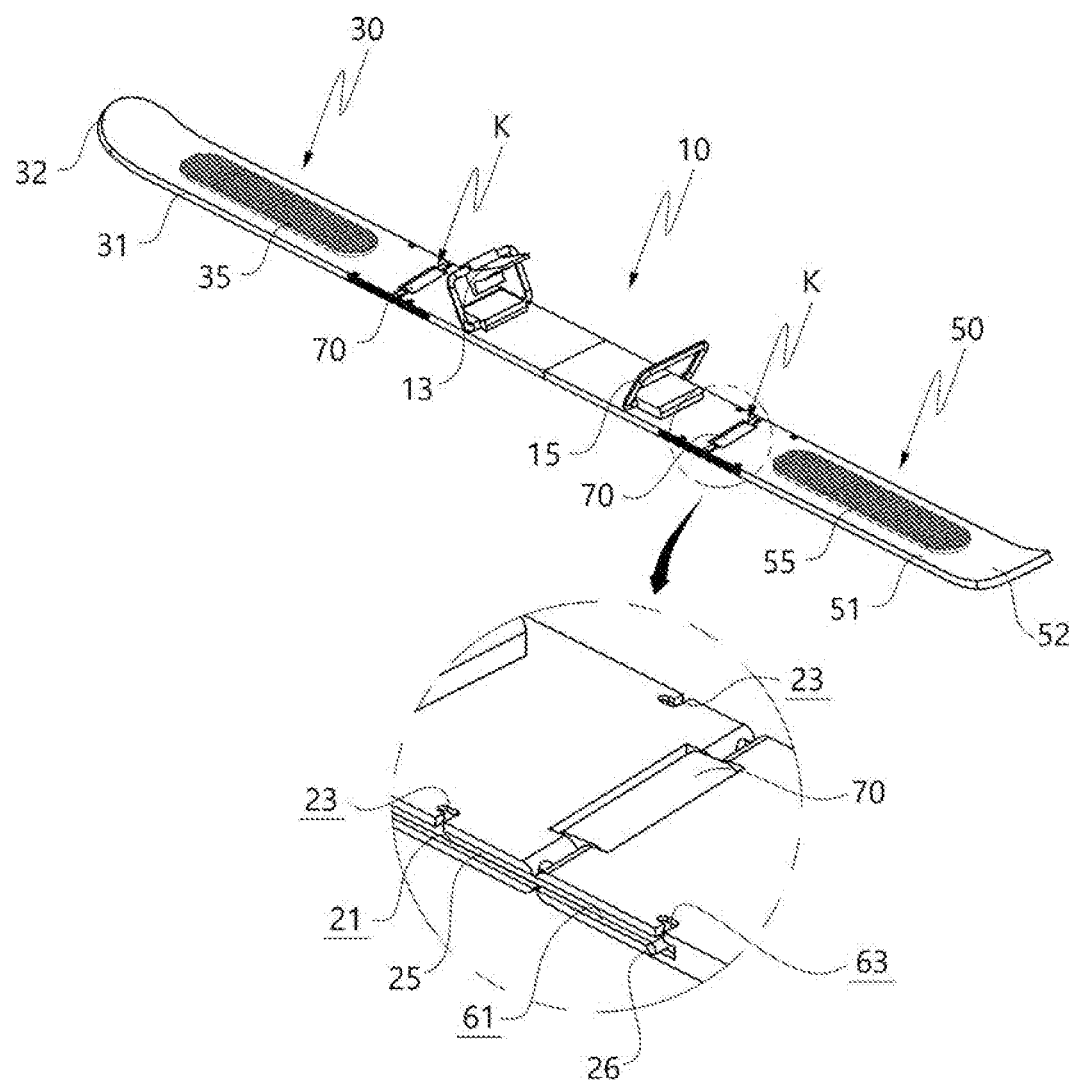
FIG. 1 is a perspective view illustrating an unfolded state of a foldable snow sliding device according to a first embodiment of the present invention.

Referring to FIG. 1, a foldable snow sliding device according to a first embodiment of the present invention includes a deck elongated in one direction and a binding means 13 and 15. Here, the deck refers to a strip-like member to come into contact with snow, and the binding means 13 and 15 functions to fasten a user's boot to the deck. In this embodiment, the binding means 13 and 15 is specifically fixed to a center deck 10.

The deck consists of three pieces. That is, the deck includes a center deck 10 located in the middle of the deck and a pair of folding decks 30 and 50 respectively located at both longitudinal ends of the center deck 10. For convenience of description, the folding decks 30 and 50 located at the front end and the rear end of the center deck 10 are respectively referred to as a first folding deck 30 and a second folding deck 50. The first folding deck 30 and the second folding deck 50 are symmetrical in structure and have a tip 32 and a tail 52, respectively. Here, the center deck 10, the first folding deck 30, and the second folding deck 50 may be made of various materials such as metal or wood. There are two hinge members 70 one of which is provided between the first folding deck 30 and the center deck 10 and the other one of which is provided between the second folding deck 50 and the center deck 10.

The center deck 10 includes a flat strip-shaped central body 11. The binding means 13 and 15 is provided on the top surface of the central body 11. The binding means 13 and 15 includes a first fastening member 13 and a second fastening member 15. A user's boot is located between the first fastening member 13 and the second fastening member 15. The shape and structure of the binding means 13 and 15 illustrated in the drawings are only an example, and various modifications thereto are possible. For example, various types of binding 13 and 15, such as strap binding, step-in binding, and alpine binding may be mounted on the center deck 10.

The center deck 10 has center channels 21. The center channels are elongated holes (slots) extending in the longitudinal direction of the center deck 10. A locking post 25 of an unfolded-state locking unit K, which will be described below, is positioned in the center channel 21. The center channels 21 are provided in respective longitudinal end portions of the center deck 10. The center channels 21 are provided to lock both the first folding deck 30 and the second folding deck 50 not to be rotatable. The term "locking" here means preventing rotation of the folding decks 30 and 50.

In this embodiment, at each longitudinal end of the center deck, two center channels 21 are provided at both widthwise ends of the center deck 10, respectively. That is, the center channels 21 provided at the widthwise ends of the center deck are in a pair. Thus, each of the folding decks 30 and 50 is locked by using two center channels. That is, the center deck 10 has a total of four center channels 21. Alternatively, the center channels 21 may be provided on either one side of the center deck 10 in the width direction.

An end of each center channel 21 is provided with a center locking notch 23. The center locking notch 23 extends perpendicularly to the corresponding center channel 21. A knob 26, which will be described below, is located in the center locking notch 23. When the knob 26 is positioned in the center locking notch 23, the first folding deck 30 and the second folding deck 50 can be folded with respect to the center deck because the locking posts 25 are fully inserted into the respective center channels 21. The center locking notch 23 is formed in a substantially "L" shape to prevent the knobs 26 from escaping.

Figure 2:
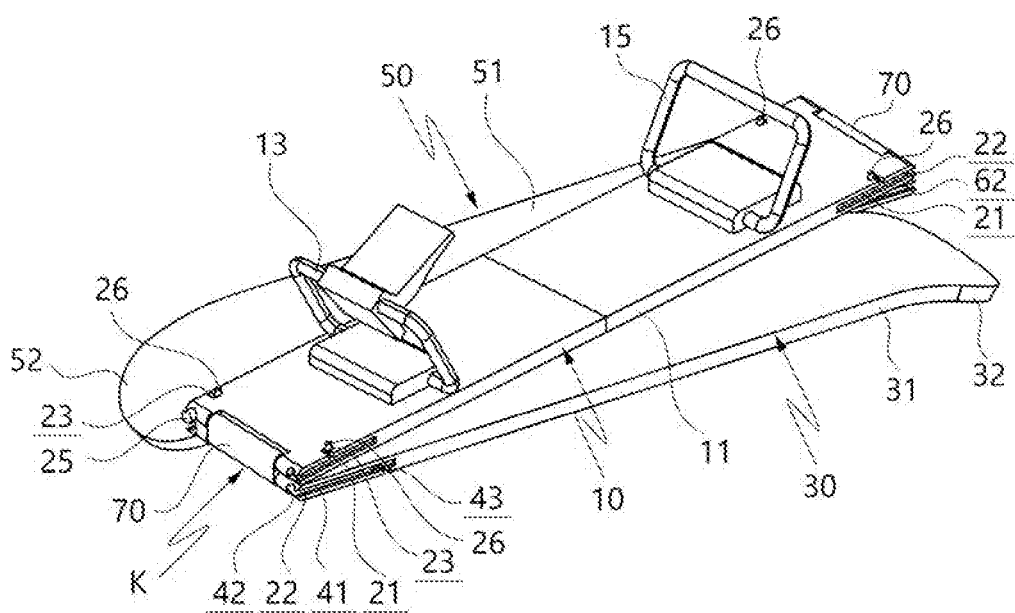
FIG. 2 is a perspective view illustrating a folded state of the foldable snow sliding device of FIG. 1.

The locking posts 25 are positioned in the respective center channels 21. The locking post 25 has a rod shape. The locking post 25 can partially protrude through a mouth 22 of the center channel 21 while most of the locking post 25 is positioned in the center channel 21. FIG. 2 illustrates a state in which one locking post 25 protrudes. When the locking posts 25 are entirely inserted into the center channels 21, the folding decks 30 and 50 can be rotated. On the other hand, when the locking posts 25 protrude from the mouths of the center channels 21 to be inserted into the folding channels 41 and 61, the folding decks 30 and 50 cannot be rotated.

One center channel 21 may be provided with two locking posts 25. In this case, the two locking posts 25 protrude in opposite directions and are inserted into the first folding channel 41 of the first folding deck 30 and the second folding channel 41 of the second folding deck 50, respectively. When the two locking posts 25 are fully moved to an inner end of the center channel 21, the two locking posts 25 are positioned only within the center channel 21 without protruding through the mouth 22 of the center channel 21. The center channel 21 may be divided into two compartments so that the two locking posts 25 can be accommodated in the respective compartments.

The locking post 25 is provided with the knob 26. The knob 26 is a kind of handle which enables a user to move the locking post 25 such that the locking post 25 sticks out of the center channel 21 or retracts into the center channel 21 through the mouth 22 according to the operation of the knob 26. The knob 26 and the locking post 25 are formed as a unitary body. That is, the knob 26 extends from the locking post 25 and protrudes outward from the center channel 21.

Although not shown, an elastic member is provided in the center channel 21 or in the first/second folding channel 41/61. The elastic member elastically supports the locking post 25 so that the locking post 25 can be moved in a locking direction or in an unlocking direction. For example, the elastic member pushes the locking post 25 toward the folding channel 41 or 61 from the center channel 21, so that the locking post 25 is moved to the folding channel 41 or 61 when an external force is not applied.

Next, the folding decks 30 and 50 will be described in detail. The folding decks 30 and 50 are respectively referred to as the first folding deck 30 and the second folding deck 50. Since the first folding deck 30 and the second folding deck 50 are symmetrical in structure, only the structure of the first folding deck 30 will be described here. The first folding deck 30 includes a first folding deck body 31 which is strip-shaped like the center deck 10. It is preferable that the first folding deck 30 has the same width and the same thickness as the center deck 10. The first folding deck 30 has a tip 32 at an outer end (front end) and the second folding deck 50 has a tail 52 at the opposite outer end (rear end). The first folding deck 30 and the second folding deck 50 are in contact with the surface of snow like the center deck 10 during sliding on the snow.

The first folding deck 30 can be rotated with respect to the center deck 10. When rotated, the first folding deck 30 comes into surface contact with an outer surface of the center deck 10. To this end, the first folding deck 30 has a first folding channel 41. The first folding channel 41 is connected with the center channel 21 in a state where the center deck 10 and the first folding deck 30 are stretched flat. In this state, the locking post 25 can move from the first folding channel 41 to the center channel 21 or from the center channel 21 to the first folding channel 41. More specifically, when the center deck 10 and the first folding deck 30 are stretched to be flush with each other, the mouth 22 of the center channel 21 and the mouth 42 of the first folding channel 41 face each other so that the locking post 25 can continuously move through the center channel 21 and the first folding channel 41. In the present invention, the locking post 25, the center channel 21, and the first folding channel 41 constitute one unfolded-state locking unit K. The unfolded-state locking unit K is formed to cross the boundary between the center deck 10 and the folding deck 30 or 50, thereby enabling the folding deck 30 or 50 to remain stretched from the center deck 10.

The first folding channel 41 has a first locking notch 43. The first locking notch 43 is formed to extend in a direction orthogonal to the first folding channel 41. The knob 26 of the locking post 25 is seated in the first locking notch 43. When the knob 26 is positioned in the first locking notch 43, a portion of the locking post 25 sticks out of the center channel 21 and is then inserted into the first folding channel 41. Therefore, the first folding deck 30 remains unfolded. The first locking notch 43 is formed in a substantially "L" shape to prevent the knob 26 from escaping.

Figure 3:
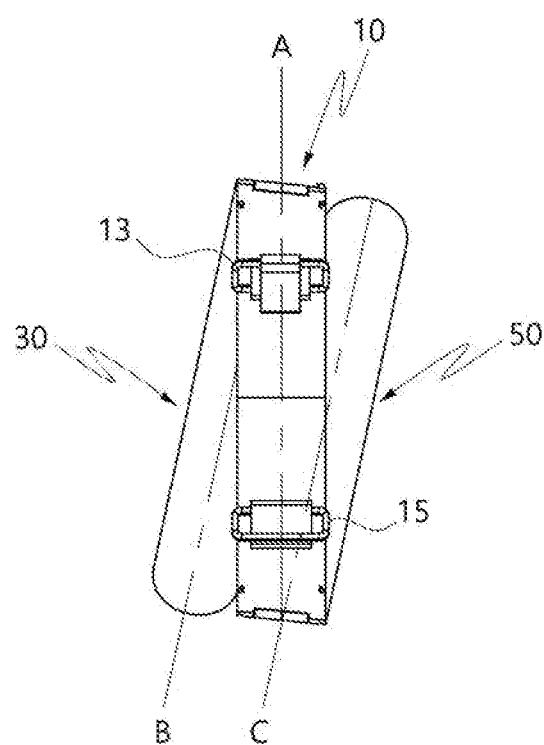
FIG. 3 is a plan view illustrating the folded state of the snow sliding device of FIG. 1.

The second folding deck 50 is symmetrical to the first folding deck 30. That is, the second folding deck 50 can be rotated with respect to the center deck 10 and can be brought into close surface contact with the outer surface of the center deck 10 when fully rotated. The second folding deck 50 has a second folding deck body 51 which is strip-shaped like the first folding deck 30. It is preferable that the second folding deck 50 is made to have the same width and the same thickness as the center deck 10. FIG. 1 illustrates a state in which the first folding deck 30 and the second folding deck 50 are unfolded, and FIGS. 2 and 3 illustrate a state in which the first folding deck 30 and the second folding deck 50 are folded.

The second folding deck 50 is folded and unfolded in the same manner as the first folding deck 30. That is, the second folding deck 50 has a second folding channel 61 similar to the first folding channel 41, and an end of the second folding channel 61 is provided with a second locking notch 63. Thus, the second folding deck 50 can be rotated with respect to the center deck 10 or can be locked in an unfolded state. When the first folding deck 30 and the second folding deck 50 are fully unfolded, a user can glide on snow with the use of the foldable snow sliding device according to the present invention.

In the embodiment described above, the center channels 21 are provided in the center deck 10 and the folding channels 41 and 61 are provided in the folding decks 30 and 50, respectively. However, in another embodiment, the center channels 21 and the folding channels may be provided outside the center deck 10 and the folding decks 30 and 50. For example, pipe-shaped locking tubes (not illustrated) are provided on the outer surface of the center deck 10 and the outer surfaces of the folding decks 30 and 50, and the center channels 21 and the folding channels 41 and 61 may be provided in the pipe-shaped locking tubes. In the former embodiment, the center channels 21 and the folding channels 41 and 61 are open in the lateral direction. Alternatively, the center channels 21 and the folding channels 41 and 61 may be open in the vertical direction.

The first folding deck 30 and the second folding deck 50 are rotatably connected with the respective longitudinal ends of the center deck 10. Since the first folding deck 30 and the second folding deck 50 are rotated in an oblique direction with respect to the center line of the center deck 10, the first folding deck 30 and the second folding deck 50 do not overlap each other. When the first folding deck 30 and the second folding deck 50 are folded toward the center deck 10, the first folding deck 30 and the second folding deck 50 extend in parallel with each other and come into close surface contact with the center deck 10. Referring to FIG. 3, an imaginary center line B passing along the central axis of the first folding deck 30 is at a predetermined angle with respect to an imaginary center line A passing along the central axis of the center deck 10. An imaginary center line C passing along the central axis of the second folding deck 50 is also at a predetermined angle respect to the imaginary center line A passing along the central axis of the center deck 10. In this embodiment, the imaginary center line B passing along the central axis of the first folding deck 30 and the imaginary center line C passing along the central axis of the second folding deck 50 are parallel. However, they are not necessarily parallel. It is required only that the first folding deck 30 and the second folding deck 50 do not overlap each other when they are folded toward the center deck 10.

Figure 4:
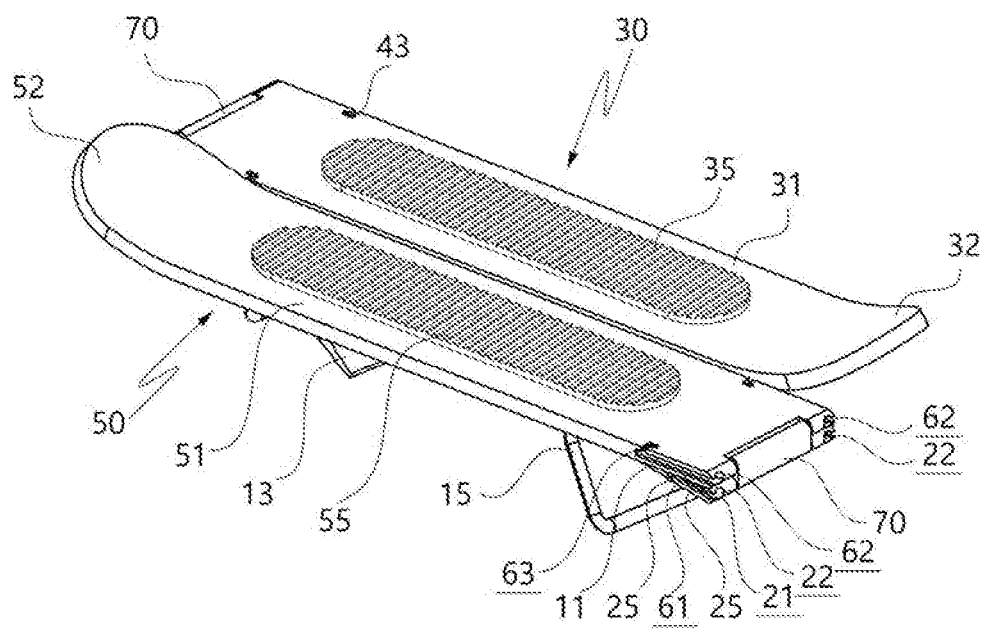
FIG. 4 is a perspective view illustrating the folded state viewed at a different angle from a viewing direction of FIG. 2.
Figure 6:
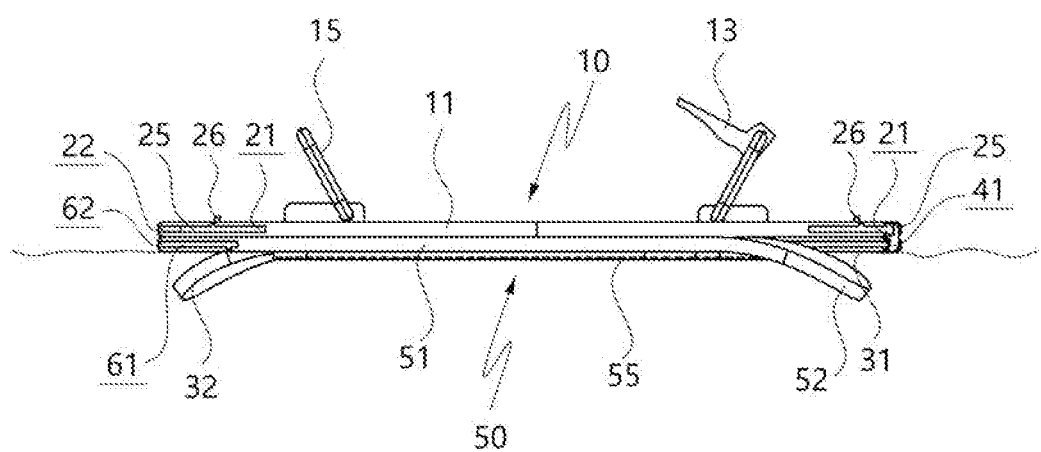
FIG. 6 is a side view illustrating a state in which the snow sliding device of FIG. 1 is laid on a snowy surface in a folded state.

Referring to FIGS. 4 and 6, when the first folding deck 30 and the second folding deck 50 are folded and brought into close surface contact with the center deck 10, the first folding deck 30, the tip 32, and the tail 52 located at the outer ends of the folding decks 30 and 50 protrude in a second direction opposite to a first direction in which the binding means 13 and 15 provided on the center deck 10 protrudes. Since the tip 32 and the tail 52 protrude in the opposite direction to the direction in which the binding means 13 and 15 protrudes, when a user wears a boot that is fastened to the center deck 10 by the binding means in a folded state, the tip 32 and the tail 52 face a snowy surface. Therefore, the tip 32 and the tail 52 pierce the snowy surface to increase frictional force, thereby helping the user to walk easily.

In order to further enhance the frictional force, anti-slipping members 33 and 55 are provided on the surfaces of the first folding deck 30 and the second folding deck 50, respectively. In a state in which the snow sliding device is folded, the surfaces on which the anti-slipping members 33 and 55 are provided face down while the surface on which the binding means 13 and 15 is provided faces up. That is, the anti-slipping members 33 and 55 and the binding means 13 and 15 are disposed on the opposite face in opposite directions when the snow sliding device is folded. The anti-slipping members 35 and 55 have a roughened surface (for example, corrugated surface) to increase the frictional force. Alternatively, the anti-slipping members 35 and 55 may be anti-slip treated films.

In addition, in order to prevent the first folding deck 30 and the second folding deck 50 from accidently being unfolded, two folded-state locking units (not illustrated) are provided. The folded-state locking units enable the first folding deck 30 and the second folding deck 50 to remain folded. For example, a protrusion and a recess are provided on a surface of the folding deck 30 (50) and a surface of the center deck 10, respectively, in which the surfaces face each other in a state in which the folding deck 30 (50) is folded and the protrusion is press-fitted into the recess. Alternatively, the folded-state locking unit includes a pair of magnets which are respectively provided on the center deck 10 and the folding deck 30 (50). Further alternatively, the folded-state locking unit includes a magnet and a metal piece which are respectively provided on the center deck 10 and the folding deck 30 (50).

The hinge member 70 provided between the folding deck 30 (50) and the center deck 10 enables the folding deck 30 (50) and the center deck 10 to perform relative rotation with respect to each other. Each hinge member 70 includes: a hinge body provided between the center deck 10 and the folding deck 30 (50) in a longitudinal direction of the center deck 10 in an unfolded state; and a pair of hinge shafts 72 that connects the hinge body with the center deck 10 and connects the hinge body with the folding deck 30 (50).

Figure 5:
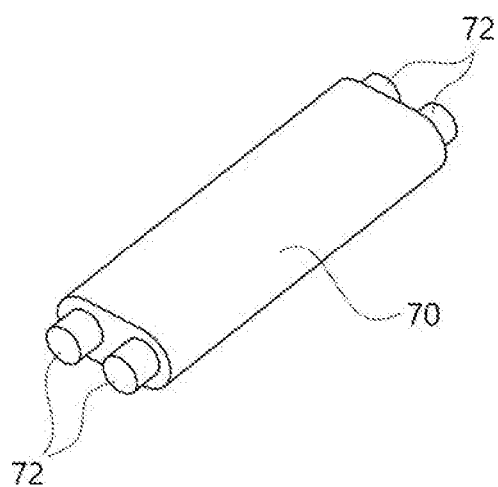
FIG. 5 is a perspective view illustrating a hinge member that is one component of the foldable snow sliding device of FIG. 1.

Referring to FIG. 2, the hinge body located between the center deck 10 and the first folding deck 30 has a predetermined thickness and length. Since the hinge body is coupled with the center deck 10 and the first folding deck 30 in a hinged manner, the center deck 10 and the first folding deck 30 can be stacked on each other when the snow sliding device is folded. FIG. 5 illustrates the pair of hinge shafts 72 to be connected with the center deck 10 and the first folding deck 30. The illustration of FIG. 5 is only an example of the hinge member 70. Alternatively, the hinge member 70 has a structure in which multiple hinge bodies are connected or the hinge body is connected to the center deck 10 and the folding deck 30 (or 50) by a fastening means such as a bolt.

Figure 7:
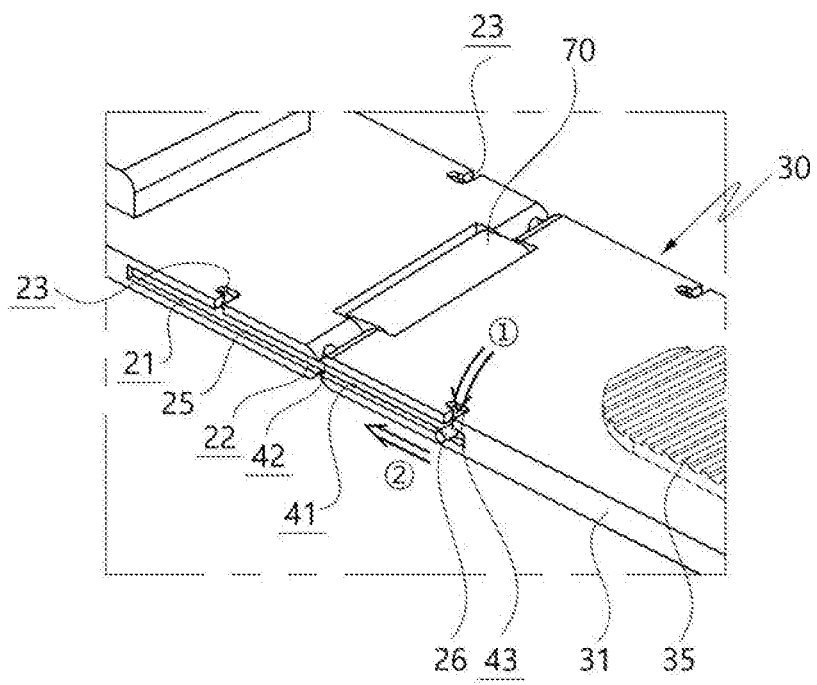
FIGS. 7 to 9 are views illustrating operational states sequentially showing a process of operating an unfolded-state locking unit that is one component of the snow sliding device of FIG. 1.
Figure 8:
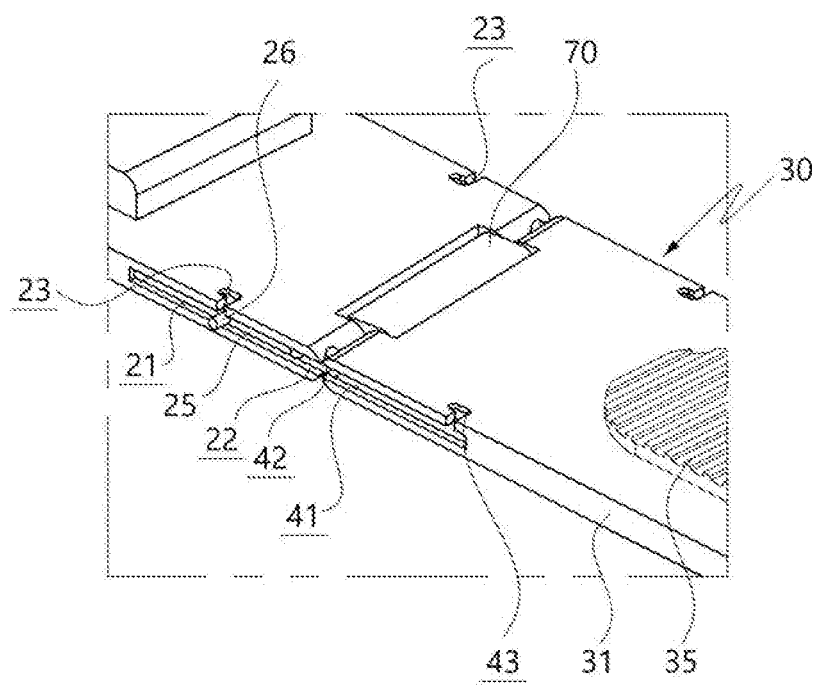
Figure 9:
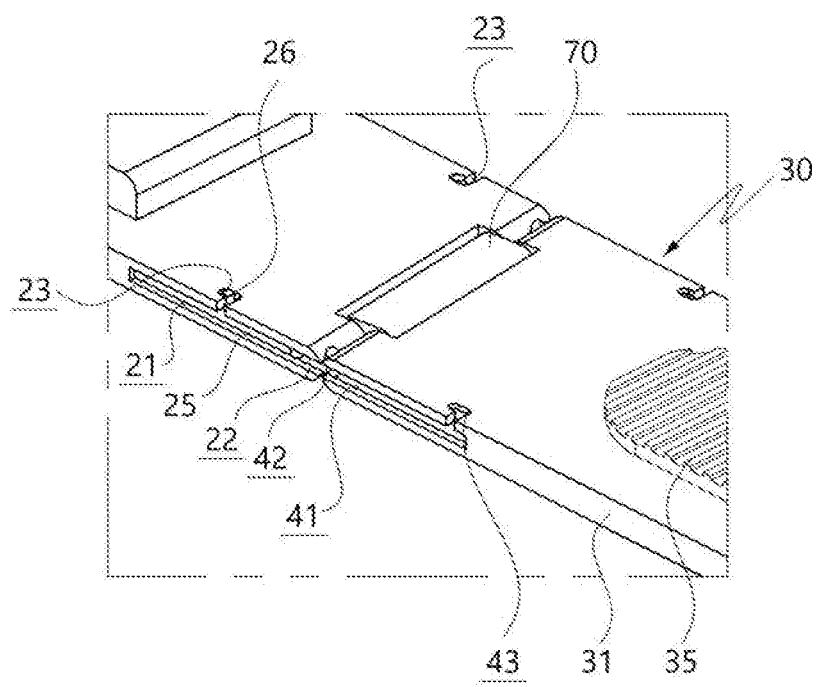

An operation of folding the folding decks 30 and 50 will be described with reference to the drawings. FIGS. 7 to 9 sequentially show a process in which the unfolded-state locking unit K is operated. First, referring to FIG. 7, the center deck 10 and the first folding deck 30 are in an unfolded state. The locking post 25 partially protrudes from the center channel 21 and enters into the first folding channel 41, and the knob 26 is seated in the first locking notch 43. In this state, the first folding deck 30 cannot rotate relative to the center deck 10.

In order to enable the first folding deck 30 to rotate relative to the center deck 10, the unfolded-state locking unit K is operated. That is, a user holds and rotates the knob 26 in a direction (the direction of arrow ① in FIG. 7) in which the knob 26 can slip out of the first locking notch 43. Then, when the knob 26 is moved toward the center channel 21 (in the direction of arrow ② in FIG. 7), the locking post 25 moves toward the center channel 21.

When the locking post 25 is fully moved to an end of the center channel 21, the knob 26 is positioned at the mouth of the center locking notch 23 of the center deck 10, as shown in FIG. 8. In this state, when the knob 26 is rotated toward the center locking notch 23, the knob 26 is inserted into the center locking notch 23, thereby preventing the locking post 25 from moving back to the first folding channel 41. The resulting state of the operation is shown in FIG. 9. Similarly, the second folding deck 50 can be locked not to rotate relative to the center deck 10.

When the first folding deck 30 and the second folding deck 50 are locked not to rotate relative to the center deck 10 by the unfolded-state locking units K as described above, the foldable snow sliding device according to the present invention is stretched flat. In this state, a user can glide on a snowy downhill slope using the foldable snow sliding device. Since the unfolded-state locking unit K keeps the folding deck 30 (50) from rotating both clockwise and counterclockwise, the user can stably glide on a snowy surface by wearing the foldable snow sliding device according to the present invention.

Figure 10:
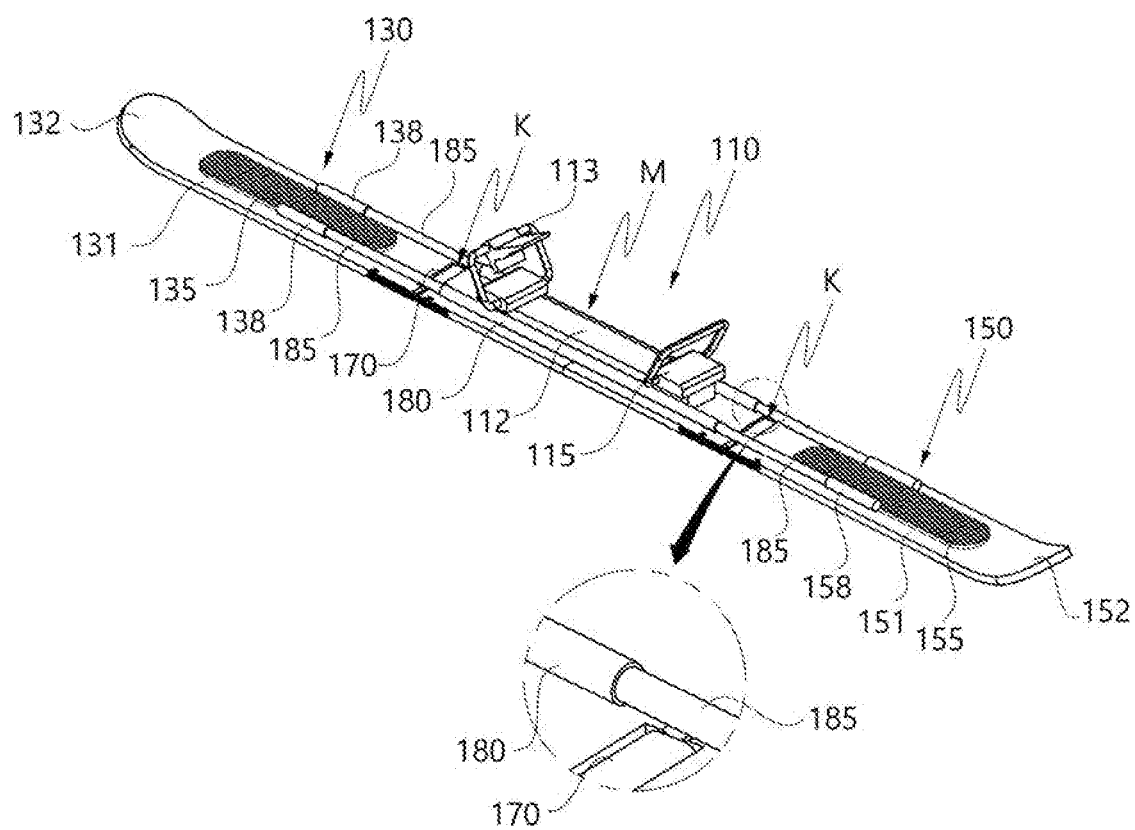
FIG. 10 is a perspective view illustrating an unfolded state of a foldable snow sliding device according to a second embodiment of the present invention.

FIG. 10 illustrates an unfolded state of a foldable snow sliding device according to a second embodiment of the present invention. In this embodiment, the same parts as those in the previous embodiment are denoted by reference numerals that are made by adding 100 to the same reference numerals as those in the previous embodiment, and a detailed description thereof will be omitted.

Referring to FIG. 10, the unfolded-state locking unit K includes an extendable rod 180. The extendable rod 180 is an elongated bar extending from a position on the outer surface of the center deck 100 to a position on the outer surface of the folding deck 130 (or 150). The extendable rod 180 is installed on either the center deck 110 or the folding deck 130 (or 150). When the extendable rod 180 is pulled out, it is stretched from a position on the outer surface of the center deck 110 to a position on the outer surface of the folding deck 130 (or 150), thereby preventing the folding deck 130 (or 150) from rotating relative to the center deck 10. The extendable rod 180 also reinforces the strength of the entire skeletal structure of the center deck 110 and the folding deck 130 (or 150).

Figure 11:
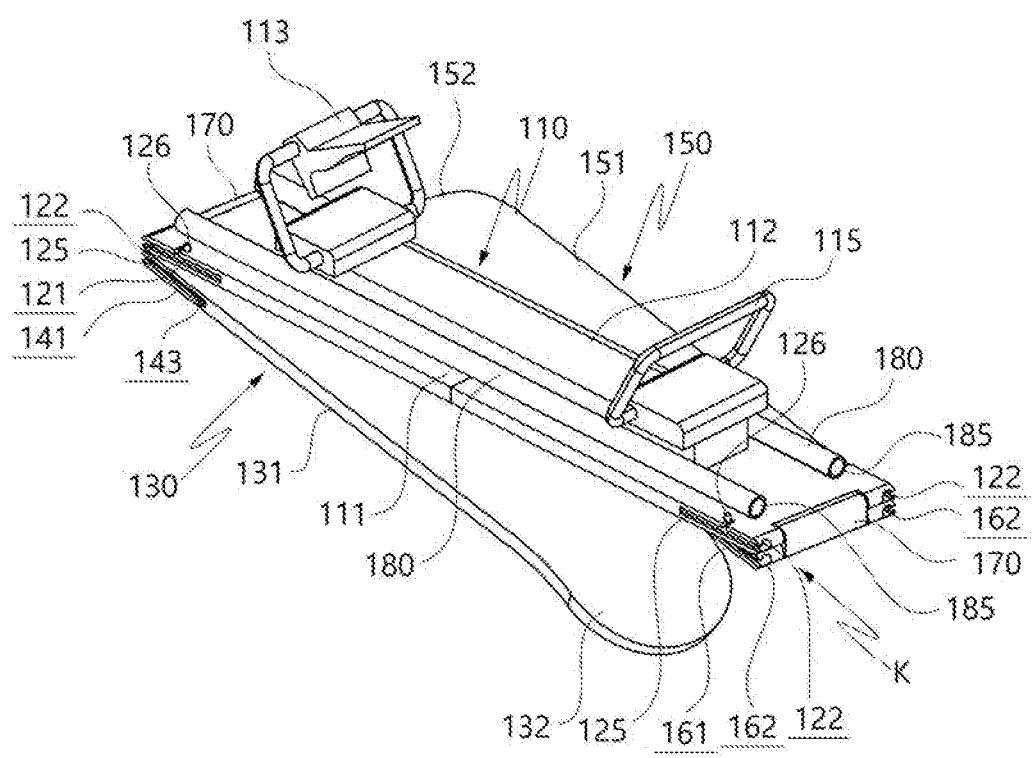
FIG. 11 is a perspective view illustrating a folded state of the snow sliding device of FIG. 10.

In this embodiment, the extendable rod 180 is installed on the center deck 110. The extendable rod 180 has a structure in which a plurality of empty cylinders having different diameters is concentrically superimposed. When the user pulls an end of the extendable rod 180, the length of the extendable rod 180 is increased. That is, as to the extendable rod 180, an inner rod 185 having a relatively small diameter is located inside an outer rod. Since the inner rod 185 can be pulled out of or retracted into the outer rod of the extendable rod 180, the entire length of the extendable rod 180 is variable according to how much the inner rod 185 is pulled out of the outer rod of the extendable rod 180. FIG. 11 shows a fully retracted state of the extendable rod 180. That is, the internal rod 185 is completely retracted into the outer rod of the extendable rod 180.

When the extendable rod 180 is stretched, the extendable rod 180 extends up to the folding deck 130 (150) from the center deck 110. The first folding deck 130 and the second folding deck 150 have fixing tubes 138 and 158, respectively so that the respective ends of the stretched extendable rod 180 are inserted into the fixing tubes 138 and 158 so as to be fixed, respectively. Alternatively, the fixing tubes 138 and 158 may be omitted. In this case, the end of the stretched extendable rod 180 may be fixed to the upper surface of the folding deck 130 (or 150). In this case, the extendable rod 180 can prevent the first folding deck 130 or the second folding deck 150 from rotating in a direction in which an external force is applied.

In this embodiment, a mounting block 112 is provided on the upper surface of the center deck 110 and between the extendable rods 180 to compensate for the height of the extendable rods 180. The binding means 113 and 115 is installed on the mounting block 112. Reference numeral M denotes a mounting portion raised due to the mounting block 112. In a further embodiment, both of the unfolded-state locking unit K using the extendable rod 180 according to the second embodiment and the unfolded-state locking unit K using the locking post 25 according to the first embodiment can be applied.

Figure 12:
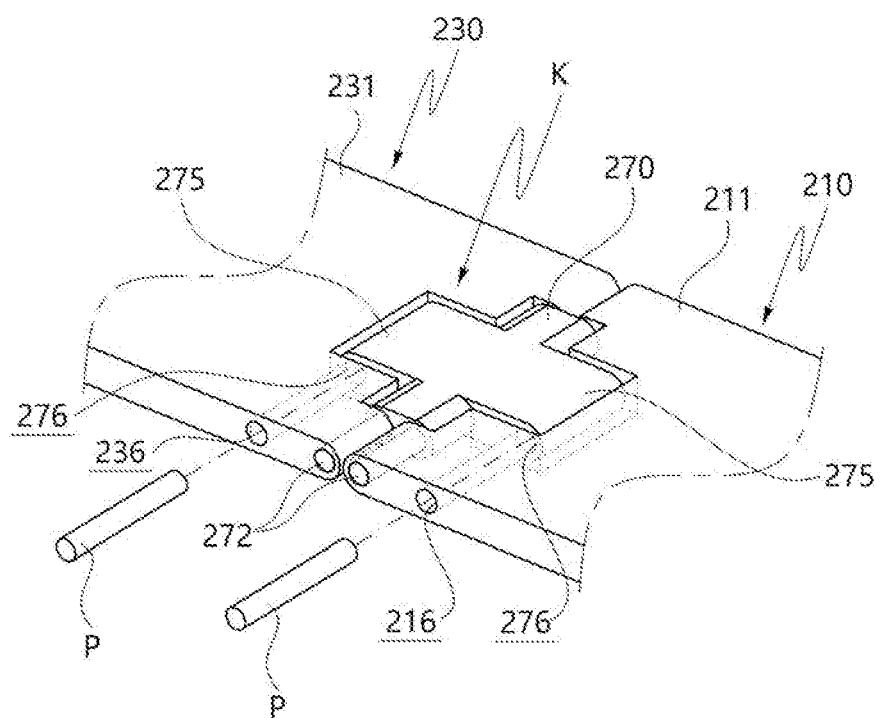
FIG. 12 is a perspective view illustrating an unfolded-state locking unit that is one component of the foldable snow sliding device according to the second embodiment of the present invention.

FIG. 12 illustrates an unfolded-state locking unit which is one component of a foldable snow sliding device according to a third embodiment of the present invention. In this embodiment, the same parts as those in the previous embodiment are denoted by reference numerals that are made by adding 200 to the same reference numerals as those in the previous embodiment, and a detailed description thereof will be omitted.

The unfolded-state locking unit K according to the third embodiment has the function of maintaining a state in which the center deck 210 and the folding deck 230 are not folded. The unfolded-state locking unit K according to the third embodiment uses the structure of a hinge member 270. The hinge member 270 includes two protrusions 275 that protrude toward the center deck 210 and the folding deck 230, respectively from the respective sides of the body thereof. Accordingly, the hinge member 270 has an approximately "+" shape.

The hinge member 270 includes two hinge shafts 272 that enable relative rotation of the folding deck 230 and the center deck 210 with respect to each other. The hinge shafts 272 connect the center deck 210 and the hinge member 270 and connect the folding deck 230 and the hinge member 270 in a rotatable manner. The hinge shafts 272 are provided as separate parts from the body of the hinge member 270 or are integrally formed with the body of the hinge member 270.

Fixing pins P are installed to pass through the respective protrusions 275 of the hinge member 270 in a widthwise direction of the center deck 210. The fixing pins P connect one of the protrusions 275 with the center deck 210 and the other one of the protrusions 275 with the folding deck 230, respectively. When the fixing pins P are inserted, the folding deck 230 and the center deck 210 cannot rotate relative to each other. This is because the fixing pins P lock the rotation function of the hinge member 270. One of the fixing pins P passes through a first fixing hole 216 formed in the center deck 210 and an insertion hole 276 formed in one of the protrusions 275 and the other fixing pin P passes through a second fixing hole 236 formed in the first folding deck 30 and an insertion hole 276 formed in the other one of the protrusions 275.

Although not illustrated, the first fixing hole 216, the second fixing hole 236, the insertion holes 276 may be provided with additional lock springs to pull or push the fixing pins P. The lock spring elastically supports the fixing pin P so that the fixing pin P can move in a specific direction. Thus, when an external force is removed, the fixing pins are inserted into the insertion holes 276. In this case, when the user pulls the fixing pins P to fold the folding deck 230 and then removes the external force, the fixing pins P automatically move inward. On the other hand, when the folding deck 230 is unfolded, the fixing pins P are automatically inserted into the insertion hole 276 so that the unfolded state can be maintained.

What is claimed is:

1. A foldable snow sliding device with a foldable deck, the device comprising:
   a flat strip-shaped center deck; and
   two folding decks rotatably connected with respective longitudinal ends of the center deck so as to be folded toward the center deck in an oblique direction with respect a center line of the center deck, whereby the folding decks do not overlap each other and extend in parallel with each other when the folding decks are folded to come into close surface contact with the center deck.

2. The device according to claim 1, wherein when the folding decks are folded to come into close surface contact with the center deck, a tip and a tail respectively provided at a front end of one of the folding decks and a rear end of the other one of the folding decks protrude in a second direction opposite to a first direction in which a binding means protrudes from a first surface of the center deck.

3. The device according to claim 2, further comprising unfolded-state locking units that are respectively provided between one of the two folding decks and the center deck and between the other one of the folding decks and the center deck, in a longitudinal direction of the center deck, wherein each of the unfolded-state locking units is formed to cross a boundary between the center deck and a corresponding one of the folding decks, thereby enabling the folding decks to remain unfolded.

4. The device according to claim 3, wherein each of the unfolded-state locking units comprises:
   a locking post movable from a center channel formed in the center deck to a folding channel formed in a corresponding one of the folding decks or from the folding channel to the center channel; and
   a knob connected to the locking post,
   wherein a mouth of the center channel and a mouth of the folding channel face each other in an unfolded state in which the center deck and the folding deck are flush with each other so that the locking post is movable from the center channel to the folding channel or from the folding channel to the center channel.

5. The device according to claim 2, further comprising unfolded-state locking units that are respectively provided between one of the folding decks and the center deck and between the other one of the folding decks and the center deck, in a longitudinal direction of the center deck, wherein each of the unfolded-state locking units is an extendable rod that is stretched on an outer surface of a corresponding one of the folding decks and an outer surface of the center deck, wherein the extendable rod is installed on the folding deck and is pulled out to be stretched to a position on the center deck or is installed on the center deck and is pulled out to be stretched to a position on the folding deck.

6. The foldable snow sliding device according to claim 2, wherein a second surface of each folding deck is provided with an anti-slipping member to increase frictional force with respect to a snowy surface, in which the second surface of each folding deck faces the second direction and the first surface of the center deck, on which the binding means is provided, faces the first direction in a state in which the folding decks are folded.

7. The device according to claim 2, further comprising folded-state locking units, each being provided at a position at which the center deck and a corresponding one of the folding decks face each other when the folding decks are folded, thereby enabling the folding decks to remain folded.

8. The device according to claim 7, wherein the folded-state locking unit comprises a pair of magnets one of which is provided on the center deck and the other one of which is provided on the folding deck, or the folded state locking unit comprises a magnet and a metal piece one of which is provided on the center deck and the other one of which is provided on the folding deck.

9. The device according to claim 1, wherein the longitudinal ends of the center deck are provided with respective hinge members, and the folding decks are rotatably coupled to the respective hinge members.

10. The foldable snow sliding device according to claim 9, wherein each of the hinge members comprises:
    a hinge body provided between the center deck and a corresponding one of the folding decks in a longitudinal direction of the center deck; and
    a pair of hinge shafts which connects the hinge body with the center deck and connects the hinge body with the corresponding one of the folding decks.

11. The device according to claim 9, further comprising unfolded-state locking units provided respectively between the center deck and one of the folding decks and between the center deck and the other one of the folding decks, in a longitudinal direction of the center deck, wherein each of the unfolded-state locking units includes two protrusions respectively protruding toward the center deck and the folding deck from the hinge member and two fixing pins one of which connects one of the protrusions with the center deck and the other one of which connects the other protrusion with the folding deck.

* * * * *